United States Patent
Dast et al.

(10) Patent No.: US 11,746,832 B2
(45) Date of Patent: Sep. 5, 2023

(54) TORSION-DAMPING DEVICE WITH SPRING SEAT WITH AXIAL GUIDANCE

(71) Applicant: VALEO EMBRAYAGES, Amiens (FR)

(72) Inventors: Pascal Dast, Cergy Pontoise (FR); Gabriel Bouche, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 117 days.

(21) Appl. No.: 17/043,142

(22) PCT Filed: Mar. 28, 2019

(86) PCT No.: PCT/EP2019/057927
§ 371 (c)(1),
(2) Date: Sep. 29, 2020

(87) PCT Pub. No.: WO2019/185835
PCT Pub. Date: Oct. 3, 2019

(65) Prior Publication Data
US 2021/0131500 A1    May 6, 2021

(30) Foreign Application Priority Data

Mar. 30, 2018 (FR) ...................................... 1852784

(51) Int. Cl.
*F16D 3/12* (2006.01)
*F16F 15/123* (2006.01)

(52) U.S. Cl.
CPC .............. *F16D 3/12* (2013.01); *F16F 15/123* (2013.01); *F16F 15/12326* (2013.01); *F16F 15/12346* (2013.01)

(58) Field of Classification Search
CPC ........... F16F 15/12326; F16F 15/12333; F16F 15/13438; F16F 15/13446; F16F 15/1232; F16F 15/12346; F16F 15/1343
(Continued)

(56) References Cited

U.S. PATENT DOCUMENTS 4,351,168 A * 9/1982 Prince ............... F16F 15/12326
                                                  192/205
4,899,617 A * 2/1990 Kobayashi ........ F16F 15/13446
                                                  192/205
(Continued)

FOREIGN PATENT DOCUMENTS

EP     0 258 112 A1    3/1988
EP     0 696 694 A1    2/1996
(Continued)

OTHER PUBLICATIONS

International Search Report dated Jun. 4, 2019 in PCT/EP2019/057927 filed on Mar. 28, 2019, 2 pages.

*Primary Examiner* — Greg Binda
(74) *Attorney, Agent, or Firm* — Oblon, McClelland, Maier & Neustadt, L.L.P.

(57) ABSTRACT

A torsion damping device for a vehicle transmission including a first rotary element and a second rotary element which are able to move in rotation relative to one another about an axis against the action of a spring acting circumferentially between these, a seat being positioned on one end of the spring, this seat comprising a first axial guidance arrangement providing axial guidance between the first rotary element and the seat, and a second axial guidance arrangement providing axial guidance between the second rotary element and the seat.

15 Claims, 6 Drawing Sheets

(58) Field of Classification Search
USPC .................................................. 464/68.92
See application file for complete search history.

(56) References Cited

U.S. PATENT DOCUMENTS

| | | | | |
|---|---|---|---|---|
| 4,904,226 | A | | 2/1990 | Chasseguet et al. |
| 5,626,518 | A | * | 5/1997 | Maki ...................... F16F 1/126 |
| | | | | 192/205 |
| 5,657,845 | A | * | 8/1997 | Szadkowski .......... F16F 15/124 |
| | | | | 192/205 |
| 5,800,270 | A | * | 9/1998 | Uenohara ............ F16F 15/1232 |
| | | | | 192/205 |
| 5,803,442 | A | * | 9/1998 | Despres ............ F16F 15/12313 |
| | | | | 192/106 R |
| 6,332,843 | B1 | * | 12/2001 | Hashimoto ......... F16F 15/1232 |
| | | | | 192/205 |
| 6,336,867 | B1 | * | 1/2002 | Uehara ............. F16F 15/12326 |
| | | | | 464/68.92 |
| 6,645,079 | B2 | * | 11/2003 | Yoshimura ........ F16F 15/12333 |
| | | | | 192/205 |
| 2008/0036128 | A1 | * | 2/2008 | Uehara ............. F16F 15/13461 |
| | | | | 248/580 |
| 2012/0322565 | A1 | * | 12/2012 | Nishitani .......... F16F 15/12333 |
| | | | | 464/68.1 |
| 2017/0276211 | A1 | * | 9/2017 | Osumi .............. F16F 15/12333 |

FOREIGN PATENT DOCUMENTS

| | | | | |
|---|---|---|---|---|
| EP | 3 026 293 A1 | | 6/2016 | |
| FR | 2875882 A1 | * | 3/2006 | ........ F16F 15/12326 |
| GB | 892697 | * | 3/1962 | ..................... 464/68 |

* cited by examiner

TORSION-DAMPING DEVICE WITH SPRING SEAT WITH AXIAL GUIDANCE

The invention relates to the field of torque transmission in motorized devices. It relates more particularly to a torsion damping device.

Motorized devices may be equipped with a torsion damping device in their transmission. Such a damping device may be included for example in a clutch disk or a torque limiter positioned between the engine and the gearbox of a vehicle. Such a torsion damping device filters out acyclic behaviors of the engine and other torsion fluctuations. These torsion damping devices allow, as torque is being transmitted, a relative rotational movement of a first rotary element and of a second rotary element, thanks to one or more springs acting circumferentially between these.

Patent application FR2732426 describes such a torsion damping device with a seat positioned on one end of the spring, this seat comprising a frontal face, designed to collaborate with the end of the spring, and a dorsal face designed to rest against the first and second rotary elements, via a pivot allowing the seat to pivot with respect to the first and second rotary elements.

It is an object of the invention to improve the torsion damping devices of the prior art.

To this end, the invention relates to a torsion damping device for a vehicle transmission comprising a first rotary element and a second rotary element which are able to move in rotation relative to one another about an axis against the action of a spring acting circumferentially between these, a seat being positioned on one end of the spring, this seat comprising: a frontal face designed to collaborate with the end of the spring; a dorsal face designed to rest against the first and second rotary elements; the seat comprising a first axial guidance arrangement providing axial guidance between the first rotary element and the seat, and a second axial guidance arrangement providing axial guidance between the second rotary element and the seat.

The damping device may further comprise the following additional features, alone or in combination:
  the first axial guidance arrangement is designed to provide axial guidance only between the first rotary element and the seat, and the second axial guidance arrangement is designed to provide axial guidance only between the second rotary element and the seat;
  of the first axial guidance arrangement and the second axial guidance arrangement, one is arranged only on a radially lower part of the seat and, of the first axial guidance arrangement and the second axial guidance arrangement, the other is arranged only on a radially upper part of the seat;
  the first axial guidance arrangement comprises a cavity formed between two axially offset walls of the first axial guidance arrangement and the second axial guidance arrangement comprises a protuberance exhibiting two axially offset walls of the second axial guidance arrangement, the two walls of the first axial guidance arrangement being distinct and radially spaced from the two walls of the second axial guidance arrangement.
  the second rotary element comprising two lateral disks which are secured to one another in terms of rotation, the protuberance of the second axial guidance arrangement being arranged axially between an edge face of one of the two lateral disks and an edge face of the other of the two lateral disks so that the two lateral disks are able to press against the walls of the second axial guidance arrangement; and the first rotary element comprising a central disk coaxial with the lateral disks and arranged between the two lateral disks, an edge face of the central disk being arranged axially in the cavity of the first axial guidance arrangement so that the central disk can press against the walls of the first axial guidance arrangement.
  the first axial guidance arrangement comprises two guide studs;
  part of the first rotary element is inserted axially between these two studs. In other words, the seat comprises a recess in which part of the first rotary element is arranged in order to provide axial guidance between the seat and the first rotary element;
  the second axial guidance arrangement comprises a guide stud;
  there is a plane perpendicular to the axis of rotation passing both through the stud of the second axial guidance arrangement and through one of the two studs of the first axial guidance arrangement.
  the two studs of the first axial guidance arrangement and the stud of the second axial guidance arrangement are radially spaced apart.
  two parts of the second rotary element are arranged axially one on either side of the stud of the second axial guidance arrangement in order to provide axial guidance between the seat and the second rotary element;
  the seat is made of a metal such as steel or sintered steel, and the guide studs have dimensions making them suitable for being obtained by cold heading.

Thus, by respectively creating the axial guidance between the seat and the first rotary element and between the seat and the second rotary element on two distinct regions of the seat, greater freedom in the sizing of the guidance arrangements is obtained.

A first advantage is that it is possible to create the seat using a method of the cold heading, cold working, cold forging, cold pressing, etc. type. Such methods are quicker and less expensive than, for example, casting in an industrial-production context. However, these methods are limited to certain component geometries and are not compatible with the seats of the prior art. The freedom in sizing that is permitted by the invention in respect of the guidance arrangements makes the guidance arrangements easier to size in order to make them compatible with this type of heading process.

Another advantage is that it is possible to reduce the axial bulk of the damping part of the torsion damping device. Specifically, in the solutions of the prior art, the guide ribs collaborate both with the first rotary element and with the second rotary element. These first and second rotary elements therefore need to be spaced apart axially at least by the thickness of the guide ribs. The guide ribs of the seats of the damping devices of the prior art are generally interposed axially between the first and second rotary elements, which means that these elements cannot be brought axially closer together during the designing of the torsion damper. The invention makes it possible, by dissociating the axial guidances between, on the one hand, the seat and the first rotary element and, on the other hand, the seat and the second element, to make the axial positions of these elements mutually independent so that these elements can therefore be brought axially closer together independently of the shape of the axial guide studs.

The expression "axial guidance" refers here to the fact of limiting, or even preventing, relative axial movement of the components in the direction of the axis of rotation.

The damping device may also comprise the following additional features, alone or in combination:

the second rotary element comprises two lateral disks which are secured to one another in terms of rotation, the guide stud of the second axial guidance arrangement being arranged axially between an edge face of one of the two lateral disks and an edge face of the other of the two lateral disks;

the first rotary element comprises a central disk coaxial with the lateral disks and arranged between the two lateral disks, an edge face of the central disk being arranged axially between the two guide studs of the first axial guidance arrangement;

the two guide studs of the first axial guidance arrangement each define a guidance surface, these two guidance surfaces being arranged axially facing one another and separated by a distance corresponding substantially to the thickness of the central disk such that these guidance surfaces are suited to axial guidance between the seat and the central disk;

the guide stud of the second guidance arrangement defines two guidance surfaces, these two guidance surfaces being separated by a distance corresponding substantially to the separation between the two lateral disks such that these guidance surfaces are suited to axial guidance between the seat and the two lateral disks;

the dorsal face of the seat is designed to press against the first and second rotary elements via a pivot that allows the seat to pivot with respect to the first and second rotary elements, the first axial guidance arrangement and the second axial guidance arrangement being arranged one on each side of the pivot. Thus, by allowing the seats to pivot, the friction at the spring is reduced and damping is improved;

the first axial guidance arrangement is situated radially on the outside of the pivot and the second axial guidance arrangement is situated radially on the inside of the pivot;

the pivot comprises a cylinder portion projecting from the dorsal face of the seat and extending axially, and the device comprises, for each spring, an opening in each of the lateral and central disks, these three openings being arranged substantially facing one another so that the spring sits in these openings, each of the openings comprising a pivot notch designed to collaborate with the pivot of the seat;

the openings in the lateral disks each comprise a cavity facing one of the guide studs of the first axial guidance arrangement, so that the two guide studs of the first axial guidance arrangement are separated from the lateral disks;

the opening in the central disk comprises a cavity facing the guide stud of the second axial guidance arrangement so that the guide stud of the second axial guidance arrangement is separated from the central disk whatever the angle of pivoting of the seat;

the opening in the central disk comprises a bearing surface for pressing against the guide stud of the second axial guidance arrangement, so as to adjust the preload on the spring when the damper is at rest;

the second axial guidance arrangement comprises just one single guide stud.

a rib extends between the single guide stud of the second axial guidance arrangement and the pivot;

the single guide stud of the second axial guidance arrangement is separated from the pivot;

the two guide studs of the first axial guidance arrangement are separated from the pivot;

the seat comprises two notches arranged axially one on each side of the single guide stud. Greater pivoting of the seat is thus possible;

the two guide studs of the first axial guidance arrangement each have a quarter-disk profile projecting from the first surface, part of the edges of the guide studs forming portions of the contour of the seat.

Preferred exemplary embodiments of the invention will now be described with reference to the accompanying drawings, in which:

FIGS. 6 and 7 show the disks visible in FIG. 2, depicted face-on;

Figure 1:
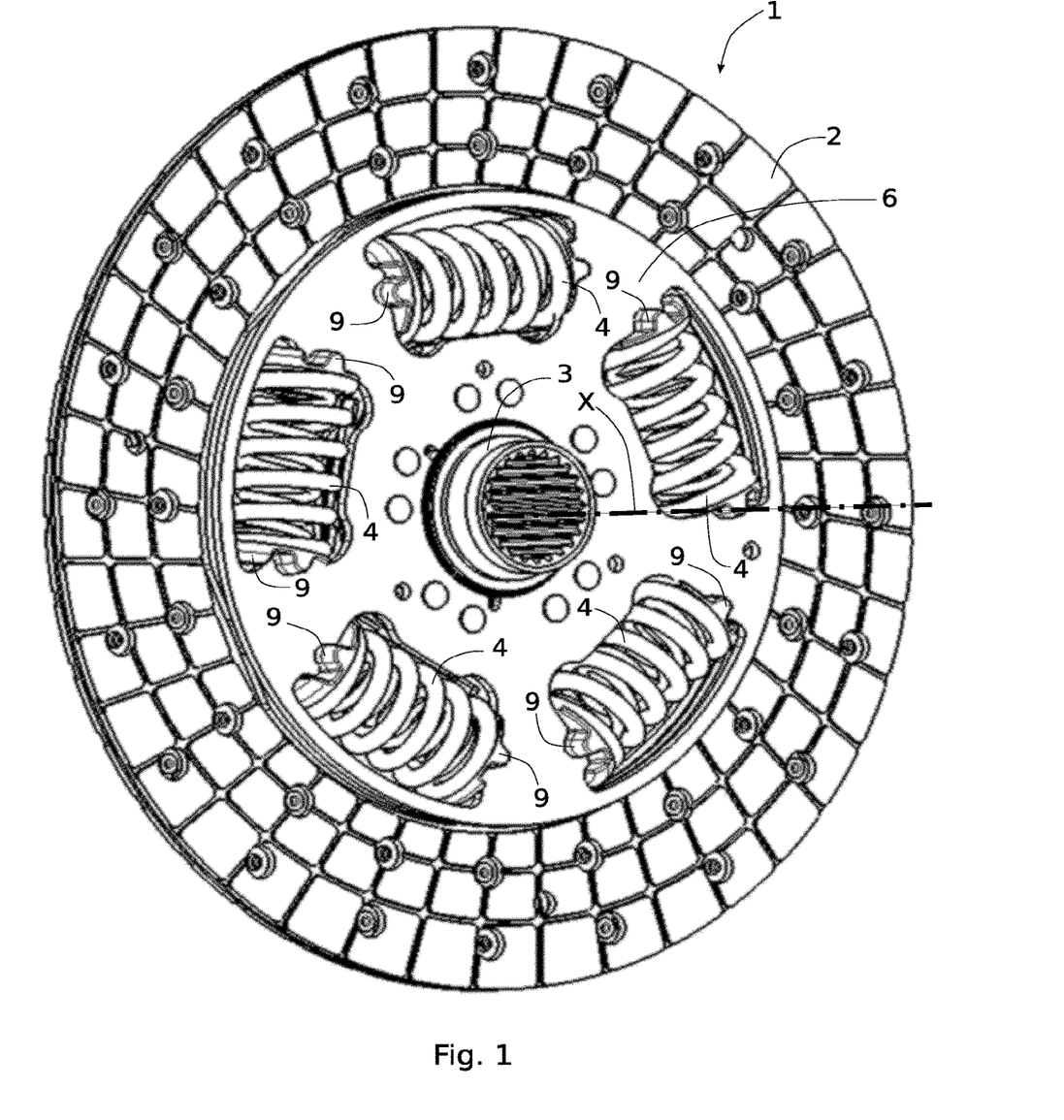
FIG. 1 depicts a clutch disk equipped with a damping device according to the invention.

The damping device according to the invention can be incorporated into any system arranged in a transmission intended to transmit the torque of an engine. FIG. 1 illustrates one exemplary embodiment in which the damping device according to the invention is incorporated into a clutch disk 1 intended to sit between the engine of a vehicle and the gearbox thereof.

The clutch disk 1 comprises a circular friction lining 2 and a central hub 3 with internal splines. The central hub 3 is intended to be rotationally coupled, via its internal splines, to the input shaft of the gearbox of the vehicle, and the friction lining 2 is intended to be rotationally coupled, via a clutch mechanism, to the flywheel of the engine of the vehicle. Torque is thus transmitted between the central hub 3 and the friction lining 2, or vice versa.

The clutch disk 1 is equipped with a torsion damping device allowing a relative rotational movement about the axis X between the central hub 3 and the friction lining 2 so as to damp torsional fluctuations during the transmission of the torque.

The torsion damping device comprises, in this example, five springs 4 arranged circumferentially around the central hub 3.

In the description and the claims, the terms "external" and "internal" and also the orientations "axial" and "radial" will be used to designate elements of the torsion damper according to the definitions given in the description. The axis X of rotation determines the "axial" orientation. An axial rotation is therefore a rotation about the axis X and axial guidance of an element limits, or even prevents, translational movement of this element along this axis X. The "radial" orientation is directed at right angles to the axis X. The circumferential orientation is directed at right angles to the axis X of rotation and at right angles to the radial direction. The terms "external" and "internal" are used to define the relative position of one component with respect to another, with reference to the axis X of rotation, a component close to said axis is thus qualified as internal as opposed to an external component located radially at the periphery. Furthermore, the angles and angular sectors expressed are defined in relation to rotation about the axis X.

The torsion damping device is designed to compress the springs 4 between a first rotary element 5 and a second rotary element 6 in order to provide damping.

Figure 2:
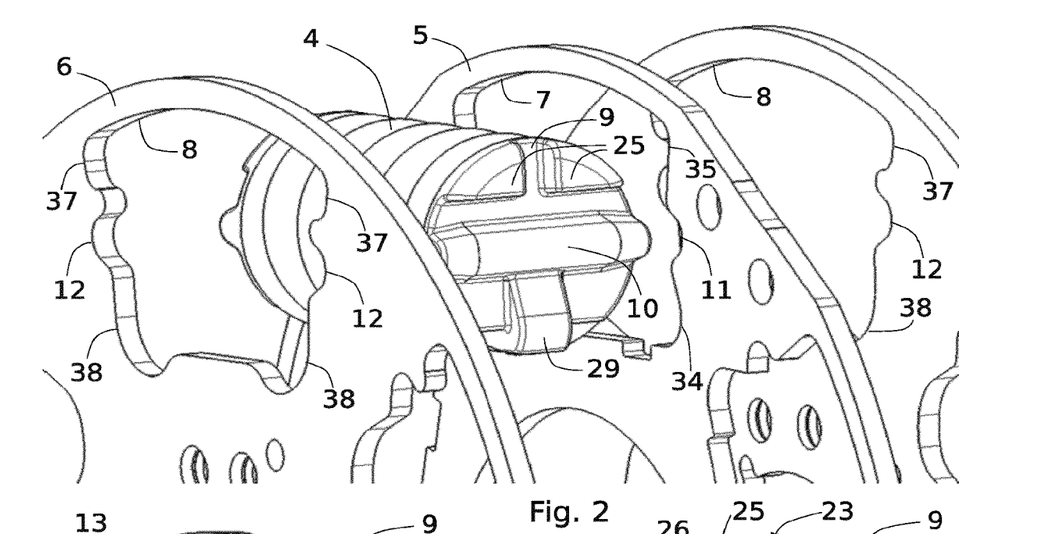
FIG. 2 is an exploded partial view of the clutch disk of FIG. 1.

FIG. 2 is an exploded and simplified view of the clutch disk of FIG. 1 is a partial perspective view centered on one of the springs 4 of the clutch disk 1 of FIG. 1.

In this example, the second rotary element consists of a pair of lateral disks, hereinafter referred to as guide washers 6, which are secured to one another in terms of rotation. The first rotary element here consists of a central disk, hereinafter referred to as flange 5, positioned between the two guide washers 6. In this example, the friction linings 2 are fixed to the flange 5, for example using supports and rivets, and the two guide washers 6 are both fixed by rivets to the central hub 3, one on each side of the flange 5.

The guide washers 6 and the flange 5 thus constitute an axial stack of three disks with the possibility of relative rotation between the flange 5 and the guide washers 6, which corresponds to the possible rotation between the friction linings 2 and the central hub 3.

For each spring 4, the flange 5 comprises an opening 7 and the guide washers 6 each comprise an opening 8. The corresponding spring 4 is mounted in the openings 7, 8 in such a way that its ends each collaborate with one edge of the opening 7 and one edge of each opening 8. The ends of the spring 4 collaborate with the openings 7, 8 via two seats 9 each positioned at one end of the spring 4. Each of the seats 9 therefore comes to bear against an edge of the opening 8 and against an edge of each of the openings 8.

Means of pivoting are provided to allow the seat 9 to pivot with respect to the flange 5 and with respect to the guide washers 6. This pivoting is allowed about an axis extending axially and centered substantially on a diameter of the seat 9. In this example, the means of pivoting consist of a pivot 10 that the seat 9 comprises and of a pivot notch 11 made in the flange 5 (the pivot notch 11 is made in the corresponding edge of the opening 7) and a pivot notch 12 made in each of the guide washers 6 (each pivot notch 12 is made in the corresponding edge of the opening 8). The pivot 10 of the seat 9 here consists of a projecting surface of the seat 9 in the form of a transverse bar extending substantially along a diameter of the seat 9. The pivot 10 comes to bear jointly against the three pivot notches 11, 12 (the pivot notch 11 at the center and, on each side thereof, the two pivot notches 12). The housing created by the three pivot notches 11, 12 thus accepts the pivot 10, allowing it to pivot about an axis extending axially, namely parallel to the axis X.

At the level of each spring 4, when a relative axial rotational movement between the flange 5 and the two guide washers 6 occurs, one of the seats 9 is compressed only by the flange 5 and moves away from the edges of the openings 8 of the guide washers 6, while the other seat 9, on the opposite end of the spring 4, comes to bear only on the guide washers 6 whereas the edge of the opening 7 of the flange 5 moves further away. The spring 4 is thus compressed during relative movements between the flange 5 and the guide washers 6 in order to perform the torsion damping function. The collaboration between the ends of the spring 4 and the flange 5 and the guide washers 6 is optimized and made more reliable by the seats 9 which hold the spring 4 in place and provide an interface that prevents the ends of the spring 4 from becoming damaged on contact with the flange 5 and with the guide washers 6. The seats 9 also provide optimal guidance for the spring 4 thanks to the pivot 10 allowing compression of the spring 4 without parasitic load (the ends of the spring 4 remain substantially parallel to one another during the course of its compression, thanks to the pivot 10). The seats 9 are additionally guided axially with respect to the flange 5 and to the guide washers 6 while contributing to preventing the axial translational movement of the flange 5 and of the guide washers 6. The seats 9 for that purpose comprise guidance arrangements, described later on, comprising surfaces that maintain the relative positions, in the axial direction, between the seat 9 and the flange 5 and between the seat 9 and the guide washers 6.

Figures 3, 4, 5:
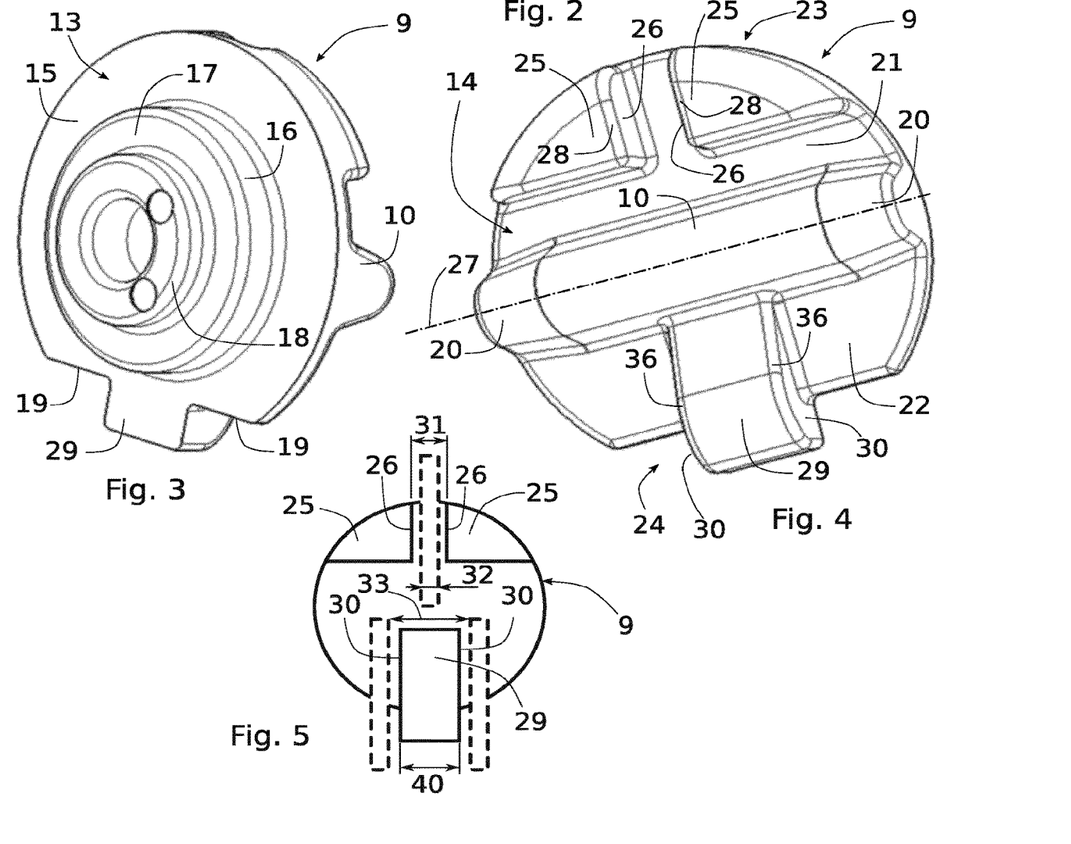
FIGS. 3 and 4 are perspective depictions of one of the seats of the damping device of FIGS. 1 and 2 and respectively show the frontal face and the dorsal face thereof.
FIG. 5 is a schematic view showing the arrangement of the dorsal face of the seat of FIGS. 3 and 4.

The seat 9 comprises a frontal face 13, depicted in FIG. 3, designed to collaborate with one end of the spring 4. The seat 9 also comprises a dorsal face 14, depicted in FIG. 4, and intended to collaborate with the edges of the openings 7, 8 of the flange 5 and of the guide washers 6.

The seat 9 comprises, on its frontal face 13, a circular bearing surface 15 intended to support the end turn of the spring 4, and a projecting central pin 16 intended to hold the spring 4 in place. The stiffness of the damping device can be increased by providing a second spring inside the spring 4, parallel to and coaxial with the latter spring, the frontal face of the seat 9 then comprising a second circular bearing surface 17 and a second central pin 18, themselves projecting from the central pin 16 and coaxial therewith. The presence or non-presence of additional springs inside the spring 4 modifies only the stiffness of the system as a whole and has no influence on the way in which the seat 9 works.

The circular bearing surface 15 additionally comprises two notches 19 which allow the seat 9 a greater angular travel in pivoting with respect to the guide washers 6 (as explained later on) at the expense of a slight reduction in the surface area of the circular bearing surface 15 but which has no impact on the quality of the support provided for the end of the spring 4.

With reference to FIG. 4, the dorsal face 14 of the seat 9 comprises the pivot 10 which takes the form of a bar extending transversely, substantially along a diameter of the seat 9. The pivot 10 is produced by a projecting surface of the dorsal face 14 of the seat 9, this projecting surface being substantially semicylindrical, except that its two lateral ends 20 are chamfered. The pivot 10 divides the dorsal face 14 of the seat 9 into two surfaces: a first surface 21 which here takes substantially the shape of half a disk and which encompasses the entire surface of the dorsal face 14 which is above the pivot 10 (when the seat 9 is in its position depicted in FIG. 4); and a second surface 22 which encompasses the entire surface of the dorsal face 14 lying below the pivot 10 (when the seat 9 is in its position of FIG. 4).

The first surface 21 comprises a first axial guidance arrangement 23 intended for axial guidance between the flange 5 and the seat 9. The second surface 22 comprises a second axial guidance arrangement 24 intended for axial guidance between the two guide washers 6 and the seat 9.

In this example, the first axial guidance arrangement 23 is produced by two guide studs 25 projecting from the first surface 21. The two studs 25 each define an axial guidance surface 26 which is substantially perpendicular to the longitudinal axis 27 in which the pivot 10 extends (and which is therefore also the axis of rotation of the seat 9 so that the pivot 10 is mounted against the pivot notches 11, 12). The two axial guidance surfaces 26, positioned one on each side of the studs 25, are therefore parallel to one another and positioned facing one another, separated by a distance substantially corresponding to the thickness of the flange 5, so as to guide the latter axially. In practice, the separation between the two axial guidance surfaces is equal to the thickness of the flange 5 increased by an operating clearance that allows the flange 5 to be inserted, via its edge face, between the two surfaces 26. In this example, this operating clearance may be 0.1 to 0.2 mm, for example. Each of the guidance surfaces 26 additionally comprises a chamfer 28 (or rounded edge) that makes the flange 5 easier to insert via its edge face between the two surfaces 26 during operation of the torsion damper. More specifically, it is the edge face of the flange 5, at the level of the corresponding edge of the opening 7, that becomes inserted between the two surfaces 26. The two studs 25, in this example, have substantially a quarter-disk profile projecting from the first surface 21, the semicircular profile edges of the studs 25 coinciding with the edges of the seat 9.

With reference to FIG. 4, the second surface 22 of the dorsal face 14 of the seat 9 comprises a single stud 29 produced by a projecting surface of the second surface 22. The single stud 29 defines two axial guidance surfaces 30 positioned one on each side of the single stud 29 and both perpendicular to the axis 27 of the pivot 10. The two axial guidance surfaces 30 are therefore parallel to one another and are separated by a distance corresponding substantially to the mutual separation of the guide washers 6 for the purposes of axial guidance of the seat. The mutual separation of the guide washers 6 refers in this application to the space available between the guide washers 6, namely the distance separating the internal faces of the guide washers 6. In practice, the distance between the two guidance surfaces 30 is equal to this mutual separation of the guide washers decreased by an operating clearance (as before, for example of 0.1 to 0.2 mm). The two guide washers 6 may therefore be arranged axially one on each side of the single stud 29, the single stud 29 becoming inserted as a close fit between the two guide washers 6 so that the seat is guided axially between the respective internal surfaces of the guide washers 6, namely their surface that faces toward the flange 5. The seat is thus held axially between the borders of the openings 12 of the guide washers 6. Because the two guide washers 6 are fixed relative to one another (through the fact that each is fixed to the central hub 3), the assembly is adequately guided in the axial direction by virtue of one single guidance surface 30 per guide washer 6 and per seat 9.

Just as was the case with the two studs 25, the single stud 29 comprises two chamfers 36 (or two rounded edges) facilitating insertion of the two guide washers 6 on either side of the single stud 29. The single stud 29 in this embodiment is connected to the pivot 10.

FIG. 5 is a schematic depiction showing the dorsal face 14 of the seat 9 collaborating with the flange 5 and the guide washers 6 (depicted in profile, in dotted line). This view illustrates those parts of the flange 5 and of the guide washers 6 that are in contact with the seat 9, and therefore illustrates the mutual axial guidance of these elements 5, 6, 6.

The flange 5, of which the profile depicted in dotted line in FIG. 5 corresponds to its thickness, collaborates only with the two studs 25. As indicated previously, the distance 31 separating the two axial guidance surfaces 26 defined by the two studs 25 is equal to the thickness 32 of the flange 5 plus an operating clearance. The operating clearance is illustrated by a separation between the thickness of the flange 32 and the two axial guidance surfaces 26, which separation has been exaggerated in FIG. 5 in order to make the figure more legible.

Likewise, the profiles of the guide washers 6, depicted in dotted line in FIG. 5, collaborate only with the single stud 29. The distance 33 separating the two guide washers 6 is equal to the distance 40 separating the two axial guidance surfaces 30 which are defined by the single stud 29, plus the operating clearance, which is also exaggerated in FIG. 5.

Figure 6:
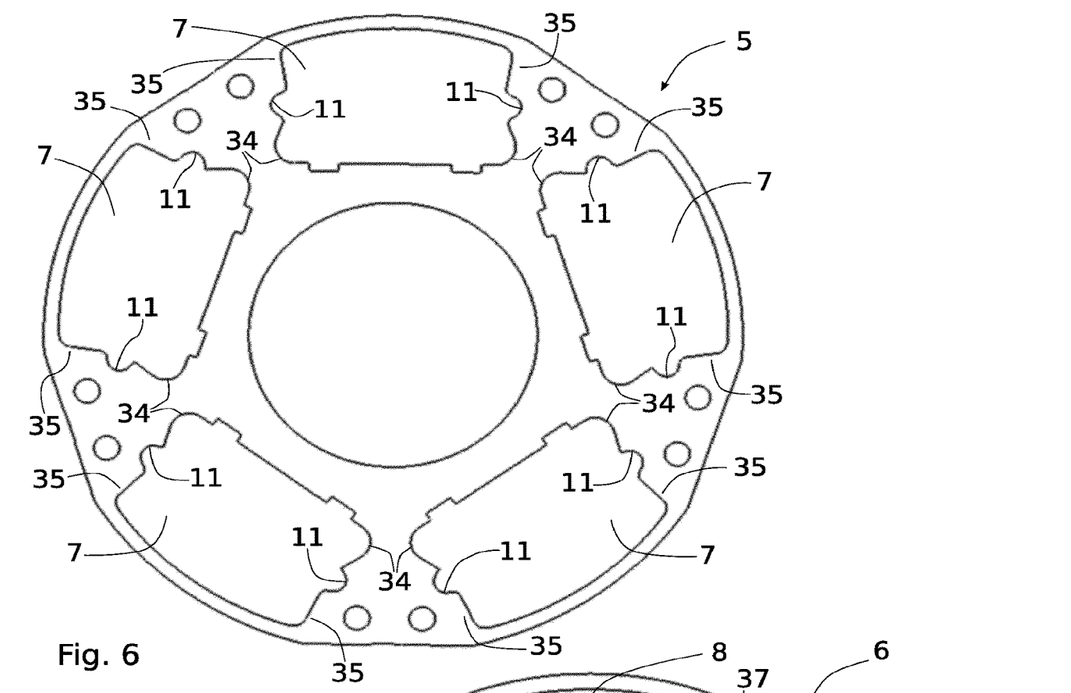
Figure 7:
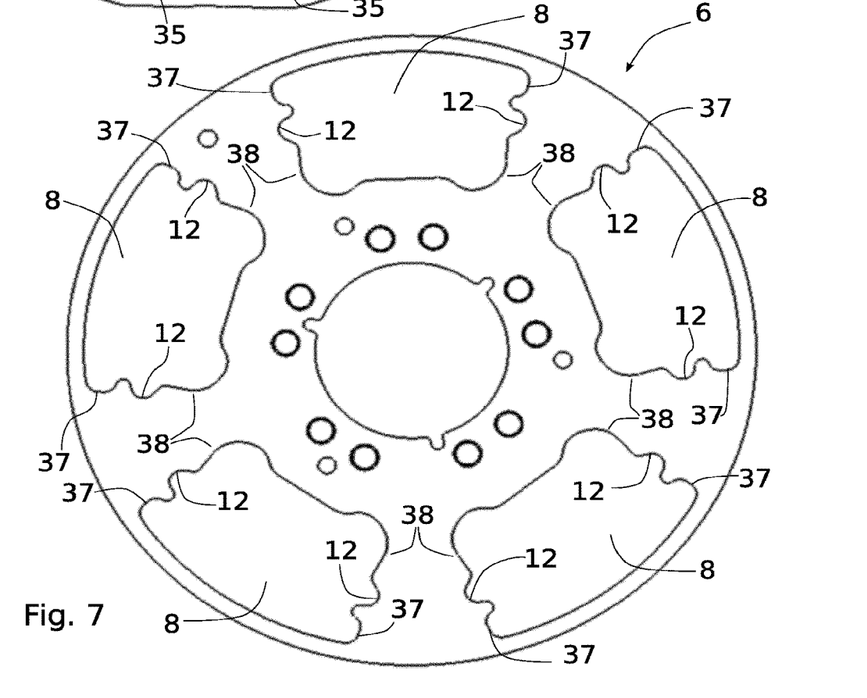

FIGS. 6 and 7 respectively depict the flange 5 and a guide washer 6, viewed face-on, namely viewed in an axial direction. These figures show the arrangement of the openings 11, 12 that allow the flange 5 to collaborate only with the two studs 25 and that allow the guide washers 6 to collaborate only with the single stud 29.

With reference to FIG. 6, the flange 5 comprises as many openings 7 as there are springs 4 in the damping device. Each opening 7 comprises two edges each collaborating with one end of the spring 4. Each edge of an opening 7 comprises the pivot notch 11 described hereinabove and also comprises an internal cavity 34 positioned radially internally with respect to the pivot notch 11. The internal cavity 34 allows the flange 5 to pass around the single stud 29, with or without clearance.

On the other side of the pivot notch 11, namely in a radially external position with respect to the pivot notch 11, the opening 7 has, on each edge, an external guidance zone 35.

The external guidance zone 35 is intended to penetrate between the two axial guidance surfaces 26 defined by the two studs 25 of the seat 9. The overall axial guidance of the flange 5 is therefore performed by all the external guidance zones 35 bordering the openings 7 and distributed circumferentially on the flange 5.

With reference to FIG. 7, the guide washer 6 comprises, as previously, as many openings 11 as there are springs 4 in the damping device. Just one guide washer 6 is described here with reference to FIG. 7, it being understood that the two guide washers 6 are identical. Each edge of an opening 8 comprises the pivot notch 12 intended to collaborate with the pivot 10 of the corresponding seat 9.

Each edge of an opening 8 also comprises an external cavity 37 positioned radially externally with respect to the pivot notch 12. This external cavity 37 is intended to pass around the stud 25 of the seat 9 facing which the slot 37 is to be positioned. As the two guide washers 6 will effectively be positioned one on each side of the single stud 29, each guide washer 6 will be positioned, at the level of its cavity 37, facing one of the studs 25. The cavity 37 is intended to pass, with clearance, around the corresponding stud 25, which means to say that the guide washer 6, by virtue of the cavity 37, always remains separated from the corresponding stud 25. Thus, the two studs 25 are separated from the guide washers 6 whatever the angle of pivoting of the seat 9. Whether, therefore, the seat 9 is in one or the other of the extreme angular positions permitted by the pivot 10, the guide washers 6 will not come into contact with the seat 9.

The guide washer 6 additionally comprises, on the border of the openings 8, a guidance zone 38 arranged radially internally with respect to the pivot notch 12. This internal guidance zone 38 is intended to collaborate with one of the two axial guidance surfaces 30 defined for the single stud 29.

Within the damping device, each single stud 29 of a seat 9 is therefore surrounded by two internal guidance zones 38 each belonging to one guide washer 6 for axial guidance between the seat 9 and the guide washers 6.

Figure 8:
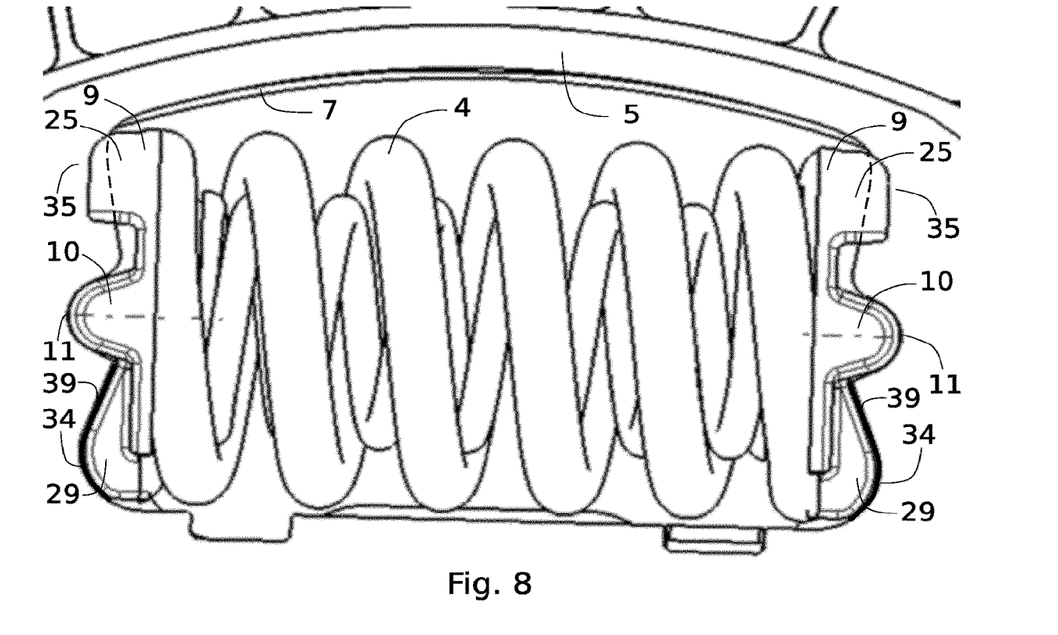
FIGS. 8 and 9 illustrate the collaboration between the seat of FIGS. 3 and 4 and the disk depicted in FIG. 6.
Figure 9:
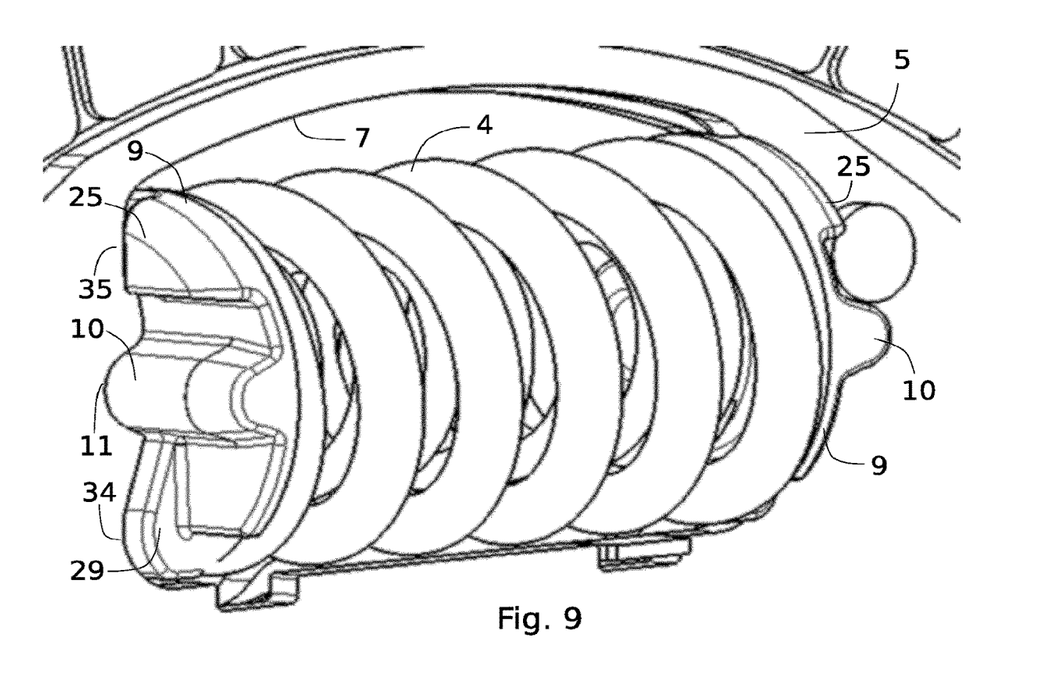

FIGS. 8 and 9 depict a spring 4 mounted in an opening 7 of the flange 5. In order to show more clearly the collaboration between the seats 9 and the edges of the opening 7 of the flange 5, the guide washers 6 have not been depicted in these figures. In the face-on view of FIG. 8, for each seat 9, the pivot 10 of the seat 9 is shown mounted in the pivot notch 11 and the radially internal cavity 34 effectively passes around the single stud 29. A clearance 39 (depicted in bold line in FIG. 8) is provided between the cavity 34 and the single stud 29 so that these two elements do not come into contact with one another.

As an alternative, the spring 4 may be preloaded at rest by providing contact between the cavity 34 and the single stud 29 and by sizing the opening 7 so that the spring 4 is pre-compressed by a certain distance. The cavity 34 then, in this variant, forms a bearing surface bearing surface for the single stud 29.

At the level of the radially external guidance zone 35, a portion of the flange 5 is inserted between the two studs 25. This portion of the flange 5 effectively disappears behind the stud 25 which is in the foreground (the seat 9 being viewed in profile). The edge of the flange 5 that passes between the two studs 25 is depicted in dotted line. This guidance zone 35 is therefore guided radially on each side by the two studs 25.

FIG. 9 is a perspective view from an angle that shows the cavity 34 that passes around the single stud 29, and the guidance zone 35 which is inserted into the space between the two studs 25.

Figure 10:
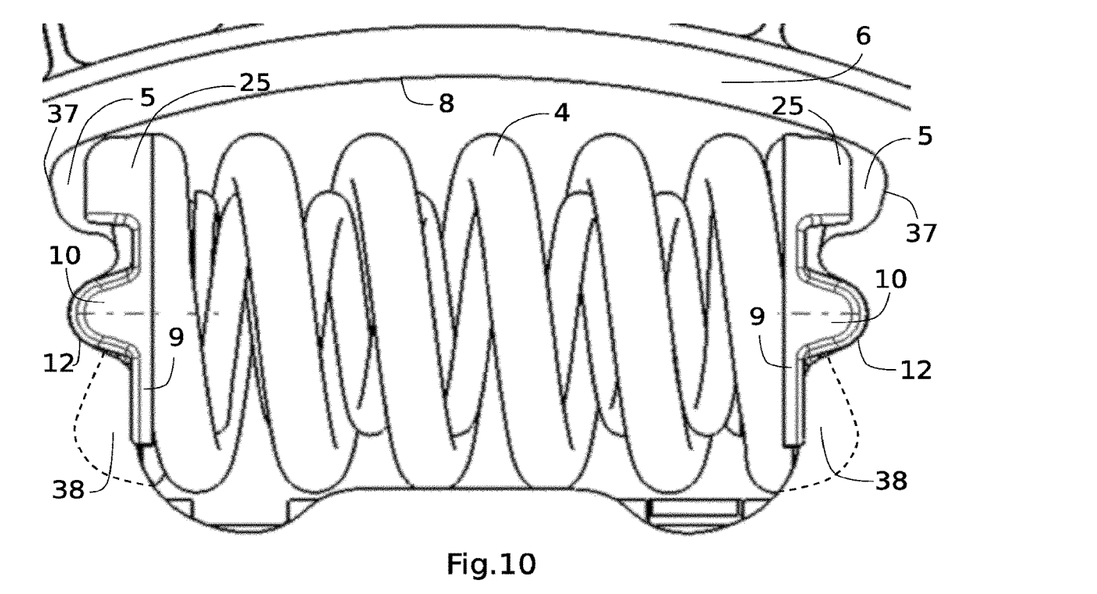
FIGS. 10 and 11 illustrate the collaboration between the seat of FIGS. 3 and 4 and the disk of FIG. 7.
Figure 11:
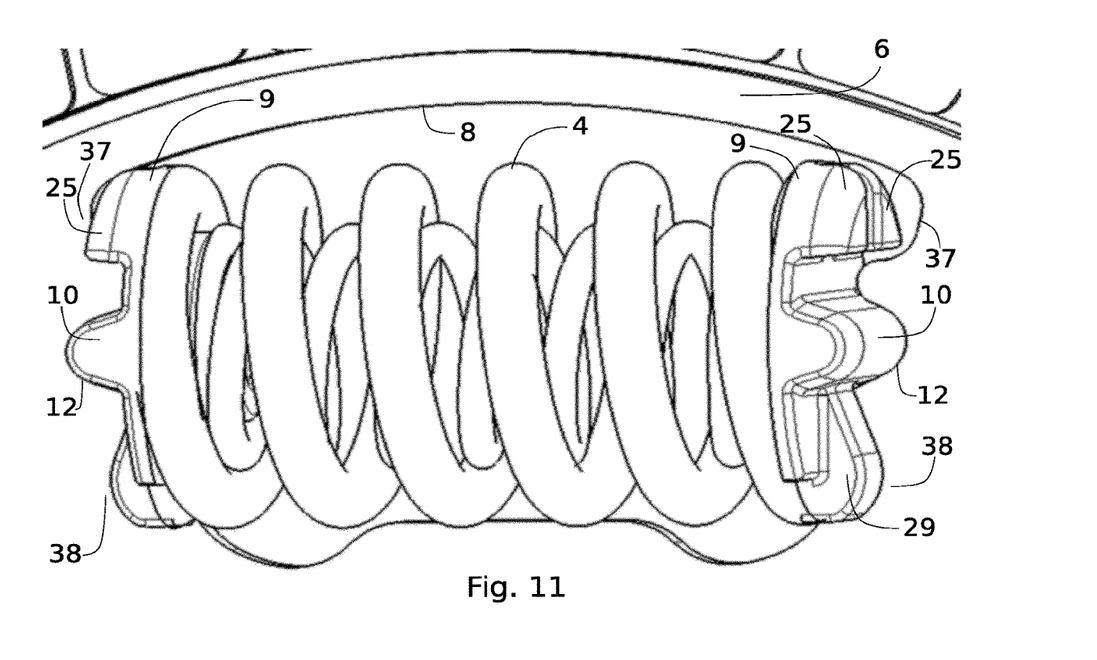

FIGS. 10 and 11 are views similar to FIGS. 8 and 9 in which, however, the guide washers 6 have been depicted in addition to the flange 5. FIGS. 10 and 11 are therefore an enlarged view of FIG. 1, centered on one of the springs 4.

In the face-on view of FIG. 10, the opening 8 of a guide washer 6 is visible in the foreground. The insertion of the pivot 10 of each seat 9 into the pivot notch 12 of the guide washer 6 is visible here. The radially external cavity 37 of the guide washer 6 is also visible on each edge of the opening 8 and effectively passes around the stud 25 facing which it is mounted. In this zone, it is possible to discern, behind the guide washer 6 in the foreground, the flange 5 and, more specifically, the guidance zone 35 of the flange 5 inserted between the two studs 25. The second guide washer 6, positioned behind the flange 5, is not visible in this view of FIG. 10.

The radially internal guidance zone 38 of the guide washer 6 in the foreground is visible here and covers the single stud 29 the profile of which is depicted in dotted line. The guidance zone 38, visible in FIG. 10, is positioned against one of the axial guidance surfaces 30 of the single stud 29.

FIG. 10 also shows the role played by the two notches 19 of the circular bearing surface 15 which allow larger angular travel in pivoting of the seat 9 without the latter touching the openings 8 of the guide washers 6.

FIG. 11 is a perspective view illustrating the face not visible in FIG. 10. In other words, if FIG. 10 is a view face-on, FIG. 11 is a view from behind. FIG. 11 therefore depicts the same guide washer 6 as the one visible in the foreground of FIG. 10, viewed from behind. In order to make the collaboration between the single stud 29 and the guidance zone 38 of the guide washer 6 visible, FIG. 11 does not depict the flange 5 or the other washer 6. In this view of FIG. 11, it is the edge of the guidance zone 38 that disappears behind the single stud 29 and which is therefore depicted in dotted line.

Figure 12:
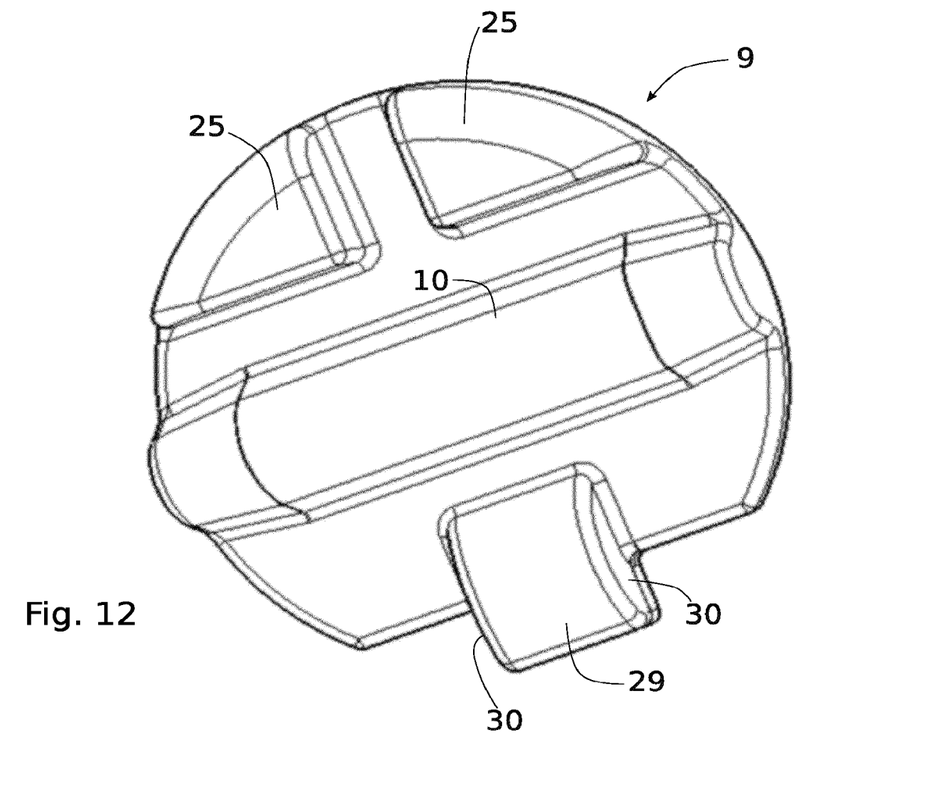
FIG. 12 illustrates a variant of the seat of FIGS. 3 and 4.

FIG. 12 illustrates a variant of the seat 9, for which the elements that are common reuse the same numerals as before. In this variant, the single stud 29 is not attached to the pivot 10 but rather is separated therefrom. The single stud 29 nevertheless has the two axial guidance surfaces 30 intended to collaborate with the two guide washers 6.

Whether it is the embodiment of FIG. 4 or 12 that is considered, the first axial guidance arrangement 23 is independent of the second axial guidance arrangement 24 which means that the shape and dimensions of the two studs 25 and of the single stud 29 can each be modified without influencing the other. In this example, the flange 5 and the guide washers 6, which collaborate with the independent guidance surfaces 21, 22, 30, can be brought axially as close as possible to one another, beyond that which is permissible when using the one same shape for both providing guidance between the flange 5 and the seat 9 and guidance between the seat 9 and the guide washers 6.

In this example, the seat 9 is made of metal and the studs 25, 29 and the pivot 10 have been chosen to allow production using a heading, notably a cold heading, method. The shapes of the studs 25, 29 and of the pivot 10 thus do not project very far from the first surface 21 and second surface 22, in comparison with their other dimensions, which means to say that their dimensions considered at right angles to the plane of the surface of the dorsal face 14 are smaller than their dimensions considered parallel to this plane. This compact appearance of the seat 9, which furthermore improves its robustness, is permitted by the dissociation of the guidance functions.

Other variants of the damping device according to the invention can be embodied without departing from the scope of the invention. For example, the damping device may be provided in any type of torque transmission device such as, for example, other types of clutch disk, torque limiters, dual-mass flywheels, or any other device comprising a torsion damper.

The flange 5 and the guide washers 6 may also have reversed functions as far as the transmission of the torque is concerned, as this does not change the guidance between the seat 9 and the flange 5 and between the seat 9 and the guide washers 6. The flange 5 may for example be attached to the central hub 3 and the guide washers 6 may be attached to the circular friction lining 2. The first rotary element and the second rotary element may also consist of a different number of disks from the numbers given here, for example two disks for each element.

Likewise, the radially external and radially internal elements may be reversed, it being possible for example for the two studs 25 to be in a radially internal position and for the single stud 29 then to be in a radially external position, with the guidance zones and corresponding cavities adapted accordingly.

The invention claimed is:

1. A torsion damping device for a vehicle transmission comprising a first rotary element and a second rotary element which are able to move in rotation relative to one another about an axis against the action of a spring acting circumferentially between these, a seat being positioned on one end of the spring, this seat comprising:
   a frontal face designed to collaborate with the end of the spring;
   a dorsal face designed to rest against the first and second rotary elements;
   wherein the seat comprises a first axial guidance arrangement providing axial guidance between the first rotary element and the seat, and a second axial guidance arrangement providing axial guidance between the second rotary element and the seat,
   wherein the first axial guidance arrangement is designed to provide axial guidance only between the first rotary element and the seat, and the second axial guidance arrangement is designed to provide axial guidance only between the second rotary element and the seat, and wherein, of the first axial guidance arrangement and the second axial guidance arrangement, one is arranged only on a radially lower part of the seat and, of the first axial guidance arrangement and the second axial guidance arrangement, the other is arranged only on a radially upper part of the seat.

2. The device as claimed in claim 1, wherein the first axial guidance arrangement comprises a cavity formed between two axially offset walls of the first axial guidance arrangement and the second axial guidance arrangement comprises a protuberance exhibiting two axially offset walls of the second axial guidance arrangement, the two walls of the first axial guidance arrangement being distinct and radially spaced from the two walls of the second axial guidance arrangement.

3. The device as claimed in claim 1, wherein the first axial guidance arrangement comprises two guide studs, and the second axial guidance arrangement comprises one guide stud.

4. The device as claimed in claim 3, wherein there is a plane perpendicular to the axis of rotation passing both through the stud of the second axial guidance arrangement and through one of the two studs of the first axial guidance arrangement.

5. The device as claimed in claim 3, wherein the two studs of the first axial guidance arrangement and the stud of the second axial guidance arrangement are radially spaced apart.

6. The device as claimed in claim 3, wherein the seat is made of a metal, and the guide studs have dimensions making them suitable for being obtained by cold heading.

7. The device as claimed in claim 3, wherein:
the second rotary element comprises two lateral disks which are secured to one another in terms of rotation, the guide stud of the second axial guidance arrangement being arranged axially between an edge face of one of the two lateral disks and an edge face of the other of the two lateral disks;
the first rotary element comprises a central disk coaxial with the lateral disks and arranged between the two lateral disks, an edge face of the central disk being arranged axially between the two guide studs of the first axial guidance arrangement.

8. The device as claimed in claim 7, wherein the dorsal face of the seat is designed to press against the first and second rotary elements via a pivot that allows the seat to pivot with respect to the first and second rotary elements, the first axial guidance arrangement and the second axial guidance arrangement being arranged one on each side of the pivot.

9. The device as claimed in claim 8, wherein the pivot comprises a cylinder portion projecting from the dorsal face of the seat and extending axially, and in that the device comprises, for each spring, an opening in each of the lateral and central disks, these three openings being arranged substantially facing one another so that the spring sits in these openings, each of the openings comprising a pivot notch designed to collaborate with the pivot of the seat.

10. The device as claimed in claim 9, wherein the openings in the lateral disks each comprise a cavity facing one of the guide studs of the first axial guidance arrangement, so that the two guide studs of the first axial guidance arrangement are separated from the lateral disks.

11. The device as claimed in claim 9, wherein the opening in the central disk comprises a cavity facing the guide stud of the second axial guidance arrangement so that the guide stud of the second axial guidance arrangement is separated from the central disk whatever the angle of pivoting of the seat.

12. The device as claimed in claim 7, wherein:
the two guide studs of the first axial guidance arrangement each define a guidance surface, these two guidance surfaces being arranged axially facing one another and separated by a distance corresponding substantially to the thickness of the central disk such that these guidance surfaces are suited to axial guidance between the seat and the central disk;
the guide stud of the second guidance arrangement defines two guidance surfaces, these two guidance surfaces being separated by a distance corresponding substantially to the separation between the two lateral disks such that these guidance surfaces are suited to axial guidance between the seat and the two lateral disks.

13. The device as claimed in claim 3, wherein the seat comprises two notches arranged axially one on each side of the guide stud.

14. The device as claimed in claim 3, wherein the second axial guidance arrangement comprises just one single guide stud.

15. The device as claimed in claim 3, wherein the seat is made of steel or sintered steel.

* * * * *